(12) United States Patent
Miller

(10) Patent No.: US 7,597,948 B2
(45) Date of Patent: Oct. 6, 2009

(54) CERAMIC HONEYCOMB STRUCTURE HAVING REDUCED STRESS WEB-SKIN JOINTS

(75) Inventor: Timothy Michael Miller, Elmira, NY (US)

(73) Assignee: Corning Incorporated, Corning, NY (US)

( * ) Notice: Subject to any disclaimer, the term of this patent is extended or adjusted under 35 U.S.C. 154(b) by 719 days.

(21) Appl. No.: 11/323,849

(22) Filed: Dec. 29, 2005

(65) Prior Publication Data

US 2007/0175178 A1  Aug. 2, 2007

(51) Int. Cl.
*B32B 3/12* (2006.01)

(52) U.S. Cl. .................. 428/116; 428/118; 428/134; 428/188; 428/192; 428/304.4

(58) Field of Classification Search ............... None
See application file for complete search history.

(56) References Cited

U.S. PATENT DOCUMENTS

| | | | |
|---|---|---|---|
| 4,233,351 A | 11/1980 | Okumura et al. | ............ 428/116 |
| 5,952,079 A | 9/1999 | Andou et al. | ............... 428/116 |
| 6,060,148 A | 5/2000 | Matsubara et al. | ........... 428/116 |
| 6,656,564 B2 | 12/2003 | Ichikawa et al. | ............. 428/116 |
| 6,827,754 B2 | 12/2004 | Suwabe et al. | ................ 55/523 |
| 2004/0206044 A1 | 10/2004 | Kondo et al. | ................ 52/782.1 |
| 2005/0186389 A1 | 8/2005 | Aoki | ......................... 428/116 |

*Primary Examiner*—Ling Xu
(74) *Attorney, Agent, or Firm*—Joseph M. Homa

(57) ABSTRACT

A ceramic honeycomb structure having reduced stress joints between its webs and skin is provided. The webs define a plurality of cells, and the skin surrounds the plurality of webs and has an inner wall that is connected to peripheral ends of the webs such that a plurality of angularly spaced wall joints are formed. Portions of the inner wall disposed between the angularly spaced wall joints include continuous arches. Each of the arches includes a curved central portion that terminates on either end on curved corner portions that are more sharply curved than the central portion. The arches eliminate sharp angles faces between the peripheral ends of the webs and the inner wall of the skin, thereby reducing stress concentrations in the interface between the webs and the skin. The arches also strengthen the skin, which allows it to be made thinner, thereby reducing thermally induced stresses in the joints between the webs and skin.

20 Claims, 4 Drawing Sheets

CERAMIC HONEYCOMB STRUCTURE HAVING REDUCED STRESS WEB-SKIN JOINTS

FIELD OF THE INVENTION

This invention generally relates to ceramic honeycomb structures, and is specifically concerned with a honeycomb structure having reduced stress web-skin joints.

BACKGROUND OF THE INVENTION

Ceramic honeycomb structures are known in the prior art. Such structures generally comprise a plurality of webs that define a plurality of cells, and a skin surrounding the plurality of webs and having an inner surface or inner wall integrally connected to peripheral ends of the webs. Such ceramic honeycomb structures are currently favored for use as ceramic catalyst substrates for automobile exhaust systems. To maximize contact between the exhaust and the catalyst coated over the webs, high cell densities on the order of 400-1200 cells per square inch are favored. However, to minimize the pressure drop with such a structure, thin webs on the order of 0.001 to 0.005 inches are typical. During manufacture, both the plurality of webs and the skin are simultaneously extruded such that sharp-cornered or filleted joints are formed between the peripheral ends of the webs, and the inner wall of the skin. The skin is typically made considerably thicker than the webs so that the extrusion which ultimately becomes the final ceramic honeycomb structure will have sufficient mechanical strength to endure the handling and cutting procedures required to render the raw extrusion into a final product.

Unfortunately, the sharp or slightly filleted interfaces between the thin webs forming the plurality of cells and the inner wall of the skin tend to concentrate mechanical stresses in these areas when mechanical forces are applied to the exterior of the skin during the manufacturing process. Additionally, the applicant has observed that the substantially greater thickness of the skin can create thermally-induced stresses at these interfaces, as the greater thickness of the skin inherently gives it a different coefficient of thermal expansion (CTE) than the substantially thinner cell walls, even though both walls are formed from the same ceramic material. Finally, the inventor has observed that during the extrusion process, these same differences in thickness between the webs and the skin creates differences in flow rate of the plasticized ceramic material as it is squeezed through the extrusion die that forms the honeycomb structure. It is theorized that these differences in the velocity of material flow weakens the joints between the peripheries of the outer webs and the inner wall of the skins.

Previous approaches to solving structural problems relating to honeycomb strength and/or the web-skin interface include a thickening of the webs in the vicinity of the periphery of the body (as shown in U.S. Pat. No. 4,233,351) and a heavier rounding or filleting of the corners of the joints between these components of the structure (as shown in U.S. Pat. No. 5,952,079 and U.S. Pat. No. 6,060,148). However, the thickening of the webs interferes with gas flow around the periphery of the structure, and the rounding of the corners of the joints does nothing to reduce stresses arising during the forming of the webs and skins which are thought to contribute to structural defects in the manufactured articles. Thus problems such as skin flaking and chipping from the outside of the fired honeycombs during handling, or even localized separations of the skin from the plurality of webs occurring during drying or firing, continue to be observed in some honeycomb designs.

Clearly, what is needed is a ceramic honeycomb structure having improved joints between the webs, and the skin which more effectively resists skin flaking and chipping, skin separation, and thermal damage in use. Such improved joints should not result in a significant thickening of either the webs or the skin such that larger thermally-induced stresses between these components would be created due to differences in CTE. Ideally, such joints would allow the skin to be made thinner so that the CTE differentials between the skin and webs could be reduced. Finally, it would be desirable if such stress-reduced joints could be easily produced by way of conventional extrusion techniques which would reduce or eliminate any differences in flow speed in the ceramic material in the joint interface area such that the resulting joints would be stronger.

SUMMARY OF THE INVENTION

Generally speaking, the invention is a ceramic honeycomb structure that fulfills all of the aforementioned criteria. To this end, the honeycomb structure comprises a plurality of webs that define a plurality of cells, a skin surrounding the plurality of webs and having an inner wall connected to peripheral ends of the webs such that a plurality of angularly spaced wall joints are formed around the inner wall, wherein portions of the inner wall disposed between the angularly spaced wall joints include continuous arches. Each of the arches includes a curved central portion that terminates in curved corner portions that are more sharply curved than the central portion. The continuous arches reduce stress in the interface between the peripheral ends of the webs and the inner wall of the skin by eliminating sharp corners or other angular interfaces between these components, and further by providing continuous support of the skin between the angularly spaced wall joints by providing an arch shape structure therebetween.

The curved central portion of the arch may be defined by a radius $R_2$ and the curved corner portions may be defined by a radius $R_1$ the radius $R_2$ of the curved central portion of the arch may be as small as one-half of the width w of the cells, or as great as the radius $R_3$ that defines the curved inner wall of the skin.

In a specific embodiment, wherein the cells have substantially uniform widths w, the skin is substantially circular and has a diameter D and a thickness $t_s$, and the webs have a substantially uniform thickness $t_w$, $R_2$ ranges between the limits defined by $$\frac{1}{2}(w - t_w) \leq R_2 < (D - 2 \cdot t_s).$$

Additionally, the radius $R_1$ of the corner portion ranges between the limits defined by $$0.001 \leq R_1 \leq \frac{1}{2}(w - t_w)$$

wherein 0.001 is inches.

The provision of continuous arches with rounded corner portions between the angularly spaced joints not only advantageously reduces stress in the interfaces defined by the joints, but further allows the skin to be made thinner relative to the webs, thereby advantageously reducing differences in the CTE between the webs and skin. Finally, such arches are easily produced via conventional extrusion techniques, and promote a more uniform flow rate of ceramic material through the extrusion tool, thereby reducing variations in the flow speed between the webs and the skin which applicant believes contributes to weakened joints between these two components and the final product.

DESCRIPTION OF THE DRAWINGS

FIG. 1 is a perspective drawing of a prior art ceramic honeycomb structure that the invention applies to;

DETAILED DESCRIPTION

Figure 1:
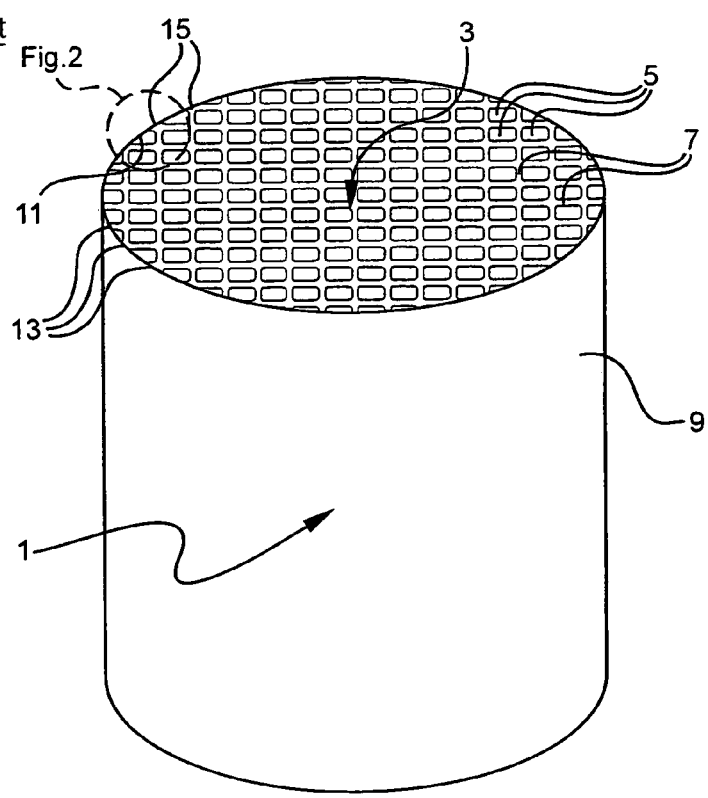
Figure 2:
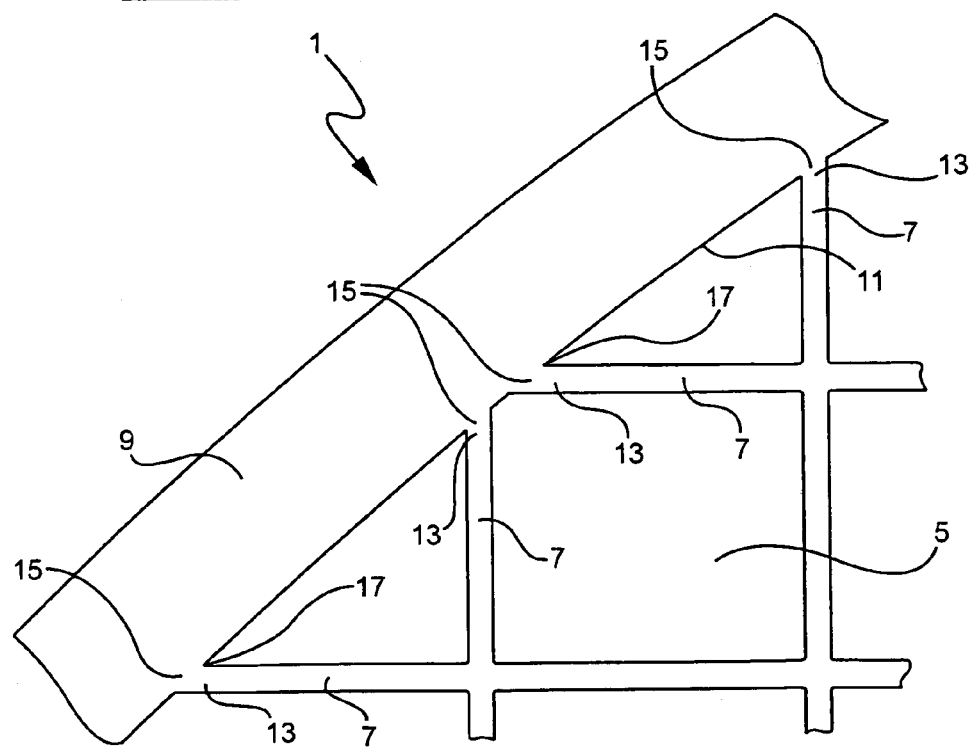
FIG. 2 is a plan view of the area circled in phantom in the ceramic honeycomb structure of FIG. 1, illustrating the sharp edges in the interface between the peripheral ends of the webs, and the inner wall of the skin.

With reference now to FIGS. 1 and 2, wherein like numerals designate like components throughout all the several figures, the ceramic honeycomb structure 1 that the invention may be applied to includes a cell array 3 formed from a plurality of individual cells 5. Each of the cells 5 is in turn defined by webs 7 integrally connected at their intersections. While the webs 7 define square-sided cells 5 in this example, other cell shapes such as hexagons are also within the scope of the invention. The cells 5 define a plurality of fluid conducting passageways extending parallel to the axis of rotation of the structure 1. Such ceramic honeycomb structures are typically used as catalytic converters for internal combustion engines. To this end, the webs 7 are coated with precious metal catalysts that promote the complete combustion of incompletely burned fossil fuel contained in the exhaust output of the engine. In order to maximize surface area contact between exhaust gases and the platinum-lined webs, high cell densities on the order of 400-1200 cells per square inch are favored. However, to minimize the pressure drop associated with such a relatively high cell density, thin webs on the order of 0.001 to 0.005 inches are generally employed.

A skin 9 is provided around the cell array 3 in order to give the structure 1 sufficient mechanical strength to withstand the various steps of manufacture without damage to the thin webs 7. Consequently, the skin 9 is typically formed on the order of about three times the thickness of the webs 7, and the peripheral ends 13 of the webs 7 are joined to the inner wall surface 11 of the skin 9 by way of integral joints 15, best seen in FIG. 2.

Relatively sharp corners 17 are formed at the intersections of the webs 78, and the inner wall 11 of the skin 9. Such sharp corners tend to concentrate mechanical stresses created by differences in properties and/or temperatures of use between the peripheral ends 13 of the webs 17, and the relatively thicker skin 9. These stresses can arise in the course of honeycomb use, or earlier during honeycomb manufacture when the extruded, green bodies that ultimately form the honeycombs 1 are fired in a ceramic kiln in order to form the final ceramic structures. Even though the skin 9 and webs 7 will comprise the same material (typically cordierite) after firing, differences in thermal or physical properties between the webs and skins can give rise to stresses that, in the presence of micro-cracks or otherwise, can cause portions of the skin 9 to separate from or easily flake away from the fired honeycomb structure, rendering it useless.

Figure 3A:
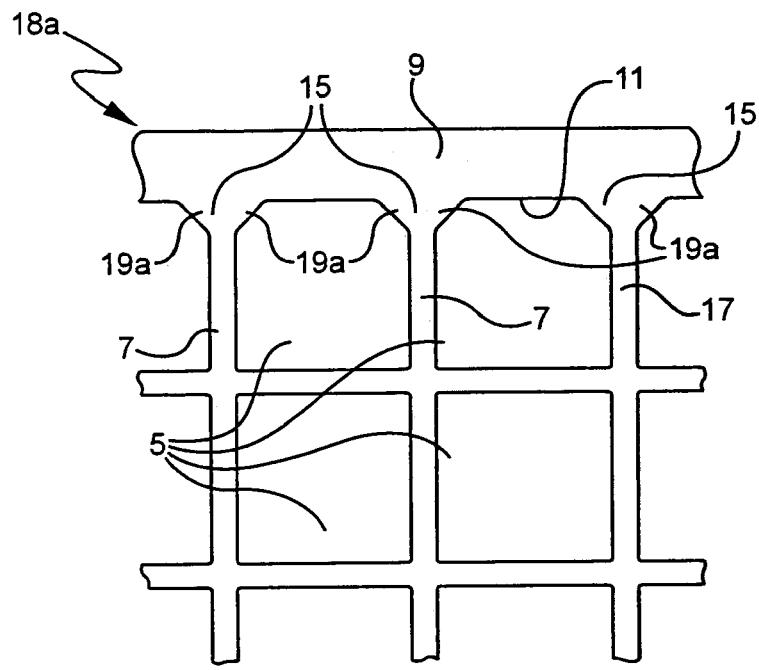
FIGS. 3A, 3B and 3C are enlarged, partial plan views of prior art ceramic honeycomb structures that provide fillets in the joints between the webs or thickened webs to reduce micro-cracking in the interface between the webs and skin.
Figure 3B:
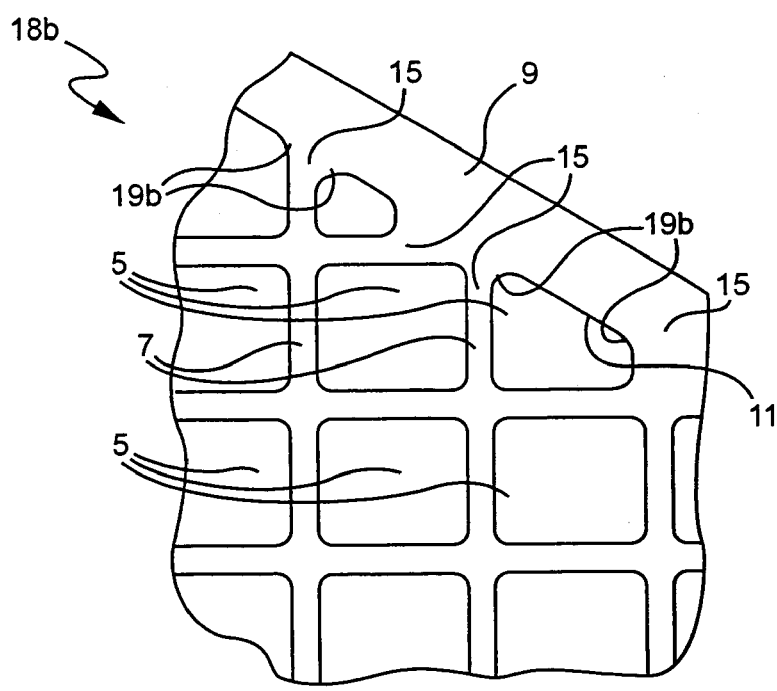
Figure 3C:
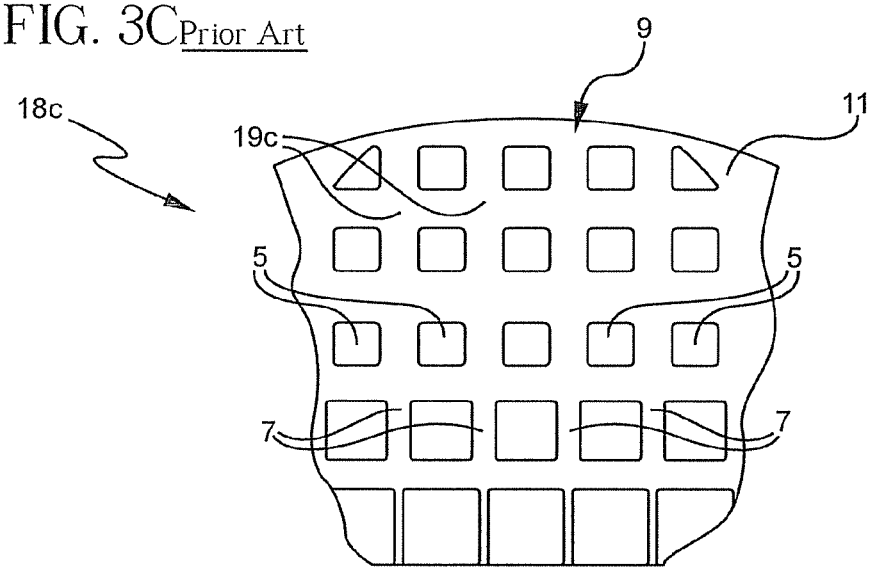

In an attempt to solve this problem, the prior art has provided enlarged fillets in the joints 15 between the peripheral ends of the webs 13 and the inner wall 11 of the skin 9 to strengthen the interface between the webs 7 and inner wall 11. In FIG. 3A, angular braces or struts 19a are provided on either side of the joints 15. In FIG. 3B, rounded fillets 19b are provided in this region. Another prior art approach to solving the micro-cracking problem is illustrated in FIG. 3C. Here, the webs 7 include thickened portions 19c which integrally connect with the inner wall 11 of the skin 9. However, in all of the prior art solutions illustrated in FIGS. 3A through 3C, the end result has been the addition of more ceramic material in the interface region between the peripheral ends of the webs 13 and the inner wall 11 of the skin 9. While the addition of such ceramic material was intended to mechanically strengthen the ceramic honeycomb in this interface region, it can at the same time exacerbate the differences in thermal expansion between the relatively thin webs 7 and the relatively thicker inner wall regions 11 of the skin 9 that can arise as the honeycombs are exposed to thermal shock conditions in actual use. The end result is that such structural reinforcements between the peripheral ends 13 of the webs 7 and the inner wall 11 can actually render the fired honeycombs more susceptible to thermal shock damage than un-reinforced structures.

Figure 4:
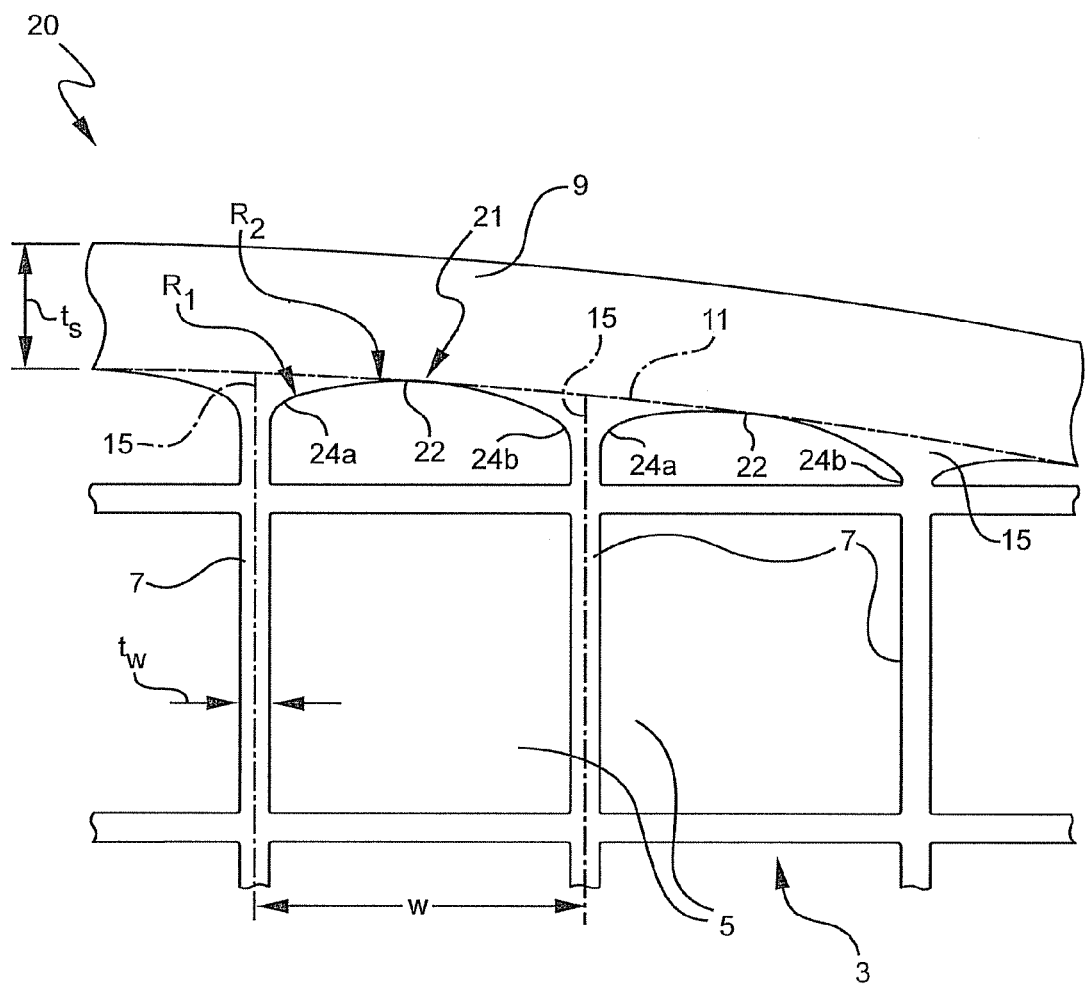
FIG. 4 is a partial plan view of a section of a ceramic honeycomb structure incorporating the invention, illustrating the continuous arches provided between the web-skin joints that improve skin damage and/or separation resistance.

FIG. 4 illustrates a partial plan cross-section of a ceramic honeycomb 20 incorporating the invention. In this structure 20, continuous arches 21 are provided between each joint 15 between a web 7, and the inner wall 11 of skin 9. Each of these arches 21 includes a curved central portion 22, which terminates at either end in curved corner portions 24a, 24b. The curved corner portions 24a, 24b are curved more sharply than the central portion 22. The provision of such arches 21 strengthens not only the joints 15 between the webs 7 in the inner wall 11 of the skin 9, but further renders the skin 9 stronger between the joints 15. The strengthening of the skin 9 advantageously allows the thickness $t_z$ of the skin 9 to be reduced relative to the thickness $t_w$ of the webs 7, thereby advantageously lowering the differences in thermal expansion that might arise between these two portions of the honeycomb structure 20, and all attendant stresses associated with such thermal expansion differences. Finally, the applicant has found that such an arched shape of the inner wall 11 of the skin 9 may be easily co-extruded with the cell array 3, thus reducing differences in extrusion speed of the ceramic batches used to form the green body. While not intending to be bound by theory, it is thought that the reduction of such speed differentials can reduce cracking damage at the web-skin intersections arising during the forming, drying and/or firing of the honeycomb structures, thereby reducing the susceptibility of the intersections between the webs 7 and the inner wall 11 of the skin 9 to mechanical or thermal damage in use.

Figure 5:
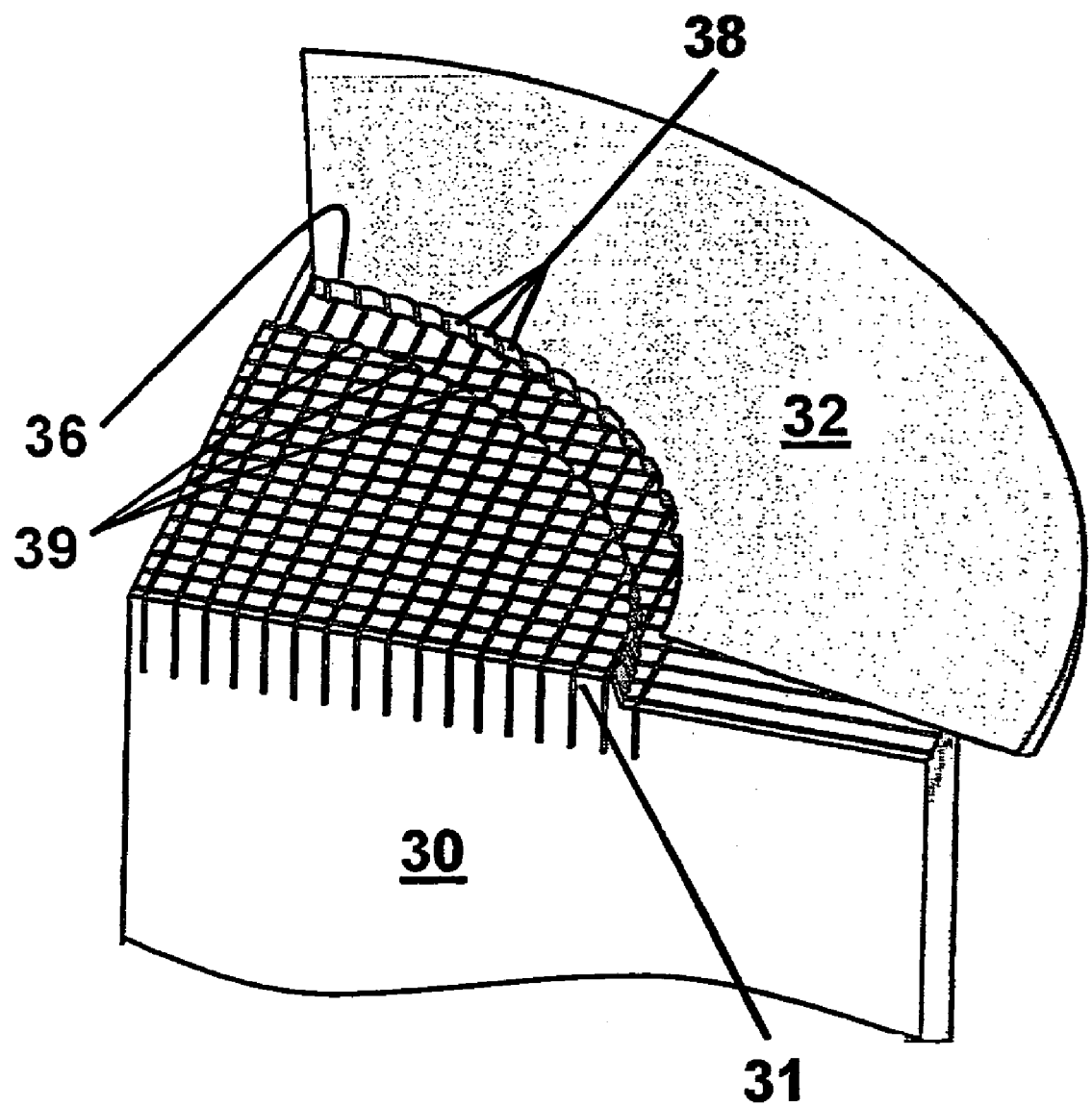
FIG. 5 is a cross-sectional perspective view of a portion of a honeycomb die used to form the ceramic honeycomb structure of the invention, along with a tool that creates the profiles of the continuous arches of the invention when a plasticized ceramic batch is extruded through the die.

The arch 21 should be designed to maximize the contact area at the joints 15 while providing continuous support of the skin 9. In one embodiment, the curved central portion 22 is arcuate, although other curves (i.e., sections of ellipses, ovals, etc.) are also possible. In all cases, the curved central portion 22 should be designed to minimize the concentrated mass section which will affect the thermal responses of the skin 9 relative to the peripheral ends 13 of the webs. When the central portion 22 is arcuate, its radius $R_2$ can be as small as half the width w of a cell 5 and as large as the radius of the inner wall 11 of skin 9. Accordingly, in a cylindrical, ceramic honeycomb structure 20 having a diameter D of 4.055 inches, a cell width or pitch w of 0.084 inches and webs 7 that are 0.004 inches thick and a skin 9 which is 0.01 inches thick, the range of the radius of an arcuate curved central portion 22 will be between 0.042 inches and 2.0175 inches. The curved corner portions 24a, 24b are also arcuate. In this example, the radius $R_1$ is 0.005 inches. However, $R_1$ may be as small as 0.0001 inches and as large as half the width or pitch w of the cell 7 (i.e., 0.084 inches). The following equations provide the design range of each of the radii $R_1$ and $R_2$:

$$0.001 \leq R_1 \leq \frac{1}{2}(w - t_w)$$

$$\frac{1}{2}(w - t_w) \leq R_2 < (D - 2 \cdot t_s)$$

where
w=cell pitch
$t_w$=web width
D=product diameter
$R_1$=web radius
$R_2$=skin radius
$t_s$=skin thickness FIG. 5 illustrates a die 30 and a shaping tool 32 which may be used to shape a raised portion 31 of the die that controls the shape of the web/inner wall interface. Here, shaping tool 32 is an annular plate having an inner edge 36 with scalloped surfaces 38 having a profile of the desired arches to be formed between adjacent joints 15 between the webs 7 and the inner wall 11 of the skin 9 as shown in FIG. 4. The scalloped surfaces 38 do not extend orthogonally along the depth of the shaping tool plate 32, but rather are inclined at an angle 15° away from the inner edge 36. When an electric current is applied to the shaping tool plate and the plate is brought into near contact with the outer surface of the raised portion 31 of the extrusion die 30, arched profiles 39 are created around the outer edge of the raised portion 31 of the extrusion die 30 via electrical discharge machining (EDM). The resulting die may be used to produce ceramic honeycomb structures 20 that include the arches 21 of the invention.

While the invention has been described above with respect to specific illustrative embodiments, it will be apparent to those familiar with the art that numerous additions, variations and modifications of such embodiments may adopted for the practice of the invention within the scope of the appended claims.

What is claimed is:

1. A ceramic honeycomb structure, comprising:
a plurality of webs that define a plurality of cells, including peripheral cells;
a skin surrounding said plurality of webs and having an inner wall connected to peripheral ends of said webs such that a plurality of angularly spaced wall joints are formed around said inner wall,
wherein portions of said inner wall disposed between said angularly spaced wall joints include continuous arches to reduce stress in an interface between said peripheral ends of said webs and said inner wall of said skin, wherein each of said arches comprises a radially inwardly concave curved central portion, and wherein the arches define at least a portion of the peripheral cells.

2. The ceramic honeycomb structure defined in claim 1, wherein each curved central portion terminates on either end in curved corner portions that are more sharply curved than said central portion, and wherein the curved central portion and the curved corner portions have the same concavity.

3. The ceramic honeycomb structure defined in claim 1, wherein said arches eliminate any angular interfaces between said peripheral ends of said webs and said inner wall of said skin.

4. The ceramic honeycomb structure defined in claim 2, wherein said curved central portion of said arch is defined by a radius $R_2$, said curved corner portions are defined by a radius $R_1$, and $R_2 > R_1$.

5. The ceramic honeycomb structure defined in claim 4, wherein said webs define cells having uniform widths, and $R_2$ is equal to or greater than one-half of said cell width.

6. The ceramic honeycomb structure defined in claim 4, wherein said inner wall of said skin is circular and has a radius of $R_3$, and $R_2$ is equal to or less than $R_3$.

7. The ceramic honeycomb structure defined in claim 4, wherein said cells have a substantially uniform width w, said skin is substantially circular and has a diameter D and a thickness $t_s$, and said webs have a substantially uniform thickness $t_w$, and $R_2$ ranges between the limits defined by:

$$\frac{1}{2}(w - t_w) \leq R_2 < (D - 2 \cdot t_s).$$

8. The ceramic honeycomb structure defined in claim 4, wherein said cells have a substantially uniform width w, and said webs have a substantially uniform thickness $t_w$, and $R_1$ ranges between the limits defined by:

$$0.001 \leq R_1 \leq \frac{1}{2}(w - t_w)$$

wherein 0.001 is inches.

9. The ceramic honeycomb structure defined in claim 1, wherein said cells define substantially parallel flow paths for fluids.

10. The ceramic honeycomb structure defined in claim 1, wherein said webs and skin are formed from cordierite material.

11. A ceramic honeycomb structure, comprising:
a plurality of webs that define a plurality of cells, including peripheral cells;
a skin surrounding said plurality of webs and having an inner wall connected to peripheral ends of said webs such that a plurality of angularly spaced wall joints are formed around said inner wall,
wherein each portion of said inner wall disposed between said angularly spaced wall joints include continuous arches each arch comprising a radially inwardly concave curved central portion that terminates in curved corner portions more sharply curved than said central portion, wherein the curved central portion and the curved corner portions have the same concavity, and wherein the arches define at least a portion of the peripheral cells.

12. The ceramic honeycomb structure defined in claim 11, wherein said curved central portion of said arch is defined by a radius $R_2$ and said curved corner portions are defined by a radius $R_1$ and $R_2 > R_1$.

13. The ceramic honeycomb structure defined in claim 12, wherein said webs define cells having uniform widths w, and said inner wall of said skin is circular having a radius $R_3$, and wherein $½ w \leq R_2 \leq R_3$.

14. The ceramic honeycomb structure defined in claim 12, wherein said cells have a substantially uniform width w, said skin is substantially circular and has a diameter D and a thickness $t_s$, and said webs have a substantially uniform thickness $t_w$, and $R_2$ ranges between the limits defined by:

$$\frac{1}{2}(w - t_w) \leq R_2 < (D - 2 \cdot t_s).$$

15. The ceramic honeycomb structure defined in claim 13, wherein said cells have a substantially uniform width w, said skin is substantially circular and has a diameter D and a thickness $t_s$, and said webs have a substantially uniform thickness $t_w$, and $R_2$ ranges between the limits defined by:

$$\frac{1}{2}(w - t_w) \leq R_2 < (D - 2 \cdot t_s).$$

16. The ceramic honeycomb structure defined in claim 11, wherein said plurality of webs define a plurality of cells having a density of between about 400-1200 cells per in.$^2$.

17. The ceramic honeycomb structure defined in claim 11, wherein said webs have a wall thickness of between about 0.001 to 0.005 inches.

18. The ceramic honeycomb structure defined in claim 17, wherein a thickness of said skin is greater than said web thickness.

19. The ceramic honeycomb structure defined in claim 11, wherein said cells define open-ended flow paths for a fluid.

20. The ceramic honeycomb structure defined in claim 11, wherein said webs define cells having substantially square cross sections.

* * * * *

UNITED STATES PATENT AND TRADEMARK OFFICE
CERTIFICATE OF CORRECTION

PATENT NO. : 7,597,948 B2  Page 1 of 1
APPLICATION NO. : 11/323849
DATED : October 6, 2009
INVENTOR(S) : Timothy Michael Miller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Twenty-eighth Day of September, 2010

David J. Kappos
*Director of the United States Patent and Trademark Office*